United States Patent [19]

Ross

[11] 3,764,996

[45] Oct. 9, 1973

[54] STORAGE CONTROL AND ADDRESS TRANSLATION

[75] Inventor: Robert Elmer Ross, West Hurley, N.Y.

[73] Assignee: International Business Machines Corporation, Armonk, N.Y.

[22] Filed: Dec. 23, 1971

[21] Appl. No.: 211,620

[52] U.S. Cl. .................................. 340/172.5, 444/1
[51] Int. Cl. .................................. G06f 9/20
[58] Field of Search .................................. 340/172.5; 444/1

[56] References Cited

UNITED STATES PATENTS

| | | | |
|---|---|---|---|
| 3,569,938 | 3/1971 | Eden et al. | 340/172.5 |
| 3,533,075 | 10/1970 | Johnson et al. | 340/172.5 |
| 3,618,040 | 11/1971 | Iwamoto et al. | 340/172.5 |

OTHER PUBLICATIONS

Morenoff et al., Communications of the ACM, Mar. 1967, Vol. 10, Issue 3, p. 149–154. (L-7140–1535)
Fikes, R. E. et al., Carnegie-Mellon University Publication, p. 33. (L-7140–2355)
Wegner, P., Proceedings of 22nd National Conference For Computing Machinery, 1967, p. 135–150. (L-71-40–146)
Dennis, J. B., Journal of the Association for Computing Machinery, 1965, Vol. 12, Issue 4, p. 589–602. (L-7140–477)
Flores, I., Datamation, 1967, Vol. 13, Issue 9, p. 41–48. (L-7140–1081)
Opler, A., Information Processing, 1965, Vol. 1, p. 273–276. (L-7140–1250)

*Primary Examiner*—Paul J. Henon
*Assistant Examiner*—Michael Sachs
*Attorney*—W. N. Barret, Jr. et al.

[57] ABSTRACT

A virtual memory system comprising a main storage and a smaller high speed buffer. Current virtual-to-real address translations for both the main storage and the buffer are retained in a Storage Control and Address Translator (SCAT). The SCAT comprises a content addressable (associative) memory. The CPU-provided virtual address is used to interrogate the SCAT. If the data that is referenced by the virtual address is available in main storage, the SCAT will provide the main storage real address. If the data is also available in the buffer, the SCAT will provide the buffer real address.

8 Claims, 6 Drawing Figures

STORAGE CONTROL AND ADDRESS TRANSLATION

INTRODUCTION

BACKGROUND OF THE INVENTION

This invention relates to computer storage systems and more particularly to computer storage systems including a main storage, a high-speed buffer storage and a dynamic address translation unit to convert a virtual address to a real physical address for storing or fetching data when requested by one of a group of requesting sources.

The following patents and applications describe many details of such storage systems and various environments wherein they may be used. Such details which are not essential to a complete understanding of this invention will not be described herein. For fuller descriptions thereof, the following patents and application are to be regarded as being incorporated into this specification by these references.

U. S. Pat. No. 3,217,298 issued on 11/9/65 to Kilburn et al. for ELECTRONIC DIGITAL COMPUTING MACHINES;

U. S. Pat. No. 3,218,611 issued on 11/16/65 to Kilburn et al. for DATA TRANSFER CONTROL DEVICE;

U. S. Pat. No. 3,230,512 issued on 1/18/66 to Seeber et al. for MEMORY SYSTEM;

U. S. Pat. No. 3,235,845 issued on 2/15/66 to Falkoff for ASSOCIATIVE MEMORY SYSTEM;

U. S. Pat. No. 3,248,702 issued on 4/26/66 to Kilburn et al. for ELECTRONIC DIGITAL COMPUTING MACHINES;

U. S. Pat. No. 3,317,898 issued on 5/2/67 to Hellerman for MEMORY SYSTEM;

U. S. Pat. No. 3,533,075 issued on 10/6/70 to Johnson et al. for DYNAMIC ADDRESS TRANSLATION UNIT WITH LOOK-AHEAD;

U.S. Pat. application Ser. No. 157,912 filed on June 29, 1971 by G. E. Schmidt et al. for DYNAMIC ADDRESS TRANSLATION REVERSED;

U.S. Pat. application Ser. No. 158,180 filed on June 30, 1971 by D. W. Anderson et al. for VIRTUAL MEMORY SYSTEM.

Various techniques are known whereby several computer programs, executed either by a single central processing unit or by a plurality of processing units, share one memory. Time sharing of such programs requires an extremely large storage capacity, a capacity which is often larger than that of the actual main storage. The total storage capacity that can be addressed by a system (assuming that the capacity exceeds the actual capacity of main storage) is defined as the "virtual storage" for the system. Thus, for example, a 24 bit addressing system provides $2^{24}$ or approximately 16 million addressable bytes. For addressing purposes, the virtual storage is divided into segments each of which is divided into pages, with each page consisting of a predetermined number of bytes. By fragmenting programs into paged segments, main storage can be allocated in paged increments. Therefore, pages can be located randomly throughout main storage and swapped in and out of main storage as pages are needed. Random location of pages necessitates the construction of page tables that reflect the actual or real location of each page. Thus, a single page table reflects the real locations of all the pages of a particular segment. Other page tables reflect the real locations of the pages associated with the other segments of the virtual storage. Random locations of the page tables necessitates the construction of a segment table that reflects the actual or real locations of the page tables. The segment table and page tables for a user are maintained in main storage and are utilized in translating a user's virtual address into a real address (an actual location in main storage) of the required page. Address translation is the process of converting the virtual addresses into actual or real main storage addresses.

With the advent of buffered storage systems, a high speed buffer is provided in addition to the main storage. The purpose of the high speed buffer is to speed up servicing of requests for data. When the addressed data is in a block (a block may be smaller than a page) that is in the buffer, a request to store or fetch information can be filled quickly. The overall effect of the buffer and the way it is used is to make main storage appear to have a faster cycle time.

In using the buffer, all requests from the processing unit are checked to see if the addressed location is in the buffer. If the buffer contains the addressed location and the request is a fetch request, the buffer is cycled and the requested data is sent to the processing unit; if the request is a store request, the data may be stored in both the buffer and in main storage (store-through) or it may be stored only in the buffer and the main storage updated at a later time (store-in-buffer). If the buffer does not contain the addressed location, then the request is passed on to main storage for a full main storage cycle. In the case of a fetch request for data not available from the buffer, the data accessed from main storage is passed back to the processing unit and is generally also stored in the buffer for future requests; in the case of a store request, the data is generally stored only in main storage. In channel operations, a fetch request for main storage data does not involve the buffer; main storage is addressed and the data is sent to the requesting channel. However, in the case of store (write) requests, the buffer is checked to see if the address location is in the buffer and if it is, the channel data is stored in both the buffer and main storage. If the address location is not in the buffer, then the channel data is stored only in main storage.

One form of buffer that may be used for such a system consists of a data array which can hold 4,096 bytes of data. The data array may be arranged to contain 64 blocks each containing 64 bytes, or eight double words. A corresponding address array is used to translate the addresses supplied by the CPU into real buffer addresses.

SUMMARY OF THE INVENTION

In accordance with the invention, means are provided, within a virtual memory system which comprises a main storage and a smaller high speed buffer, for retaining current translations of addresses provided by the CPU into real addresses which may be directly utilized for accesses to the main storage and/or the buffer. These addresses are retained in a Storage Control Address Translator (SCAT). The SCAT comprises an associative memory, each word of which contains several fields. Of the fields contained in the associative memory of the SCAT, four are of primary interest with respect to this invention: an interrogation field comprising the high-order bits (segment and page) of the address supplied by the CPU; a second interrogation field comprising that portion of the address bits provided by the CPU which, together with the high-order bits in the first interrogation field, define a block address within the buffer; a first result field which contains high-order real address bits for main storage accesses; and a second result field which contains real high-order address bits for buffer accesses. When using this invention, a virtual address provided by the CPU is used to perform two simultaneous interrogations of the SCAT. In the first interrogation, the high-order bits (segment and page) of the virtual address provided by the CPU are compared against entries in the first interrogation field of the SCAT; if one or more matches are obtained, the SCAT will supply, from its first result field, the corresponding real high-order address bits of a location in main storage. Simultaneously, the second interrogation will compare the high-order bits *and* the block address bits provided by the CPU to the first *and* second interrogation fields of the SCAT; a complete match on this comparison will cause the SCAT to provide, from its second result field, the real high-order bits that are required for a buffer access. If matches are produced on both interrogations, this will indicate that the requested data resides in main storage and in the buffer. If a match is produced for the first interrogation but not for the second, this will signify that the requested data is not in the buffer but is in main storage, and a main storage access will be required. Since the real address in main storage of the data has already been provided, no additional address translation will be necessary. (In this case, the decision as to whether or not to place the data into the high speed buffer will be made in accordance with known techniques. If the data is to be placed in the high speed buffer, known techniques will also be used to perform this operation and to update the SCAT.) If neither interrogation resulted in a match, known techniques will be utilized to perform the virtual-to-real address translation, put the translation into the SCAT, access the data, and place the data into the high speed buffer if desired.

The primary advantages of this invention are that it provides, rapidly and simultaneously, address translations for both main storage and the buffer, and that, in situations where the data is not in the buffer but is in main storage, the main storage real address will already be available with no necessity for further translation.

The foregoing and other features and advantages of the present invention will be apparent from the following description of a preferred embodiment of the invention as illustrated in the accompanying drawings.

DETAILED DESCRIPTION

Figure 1:
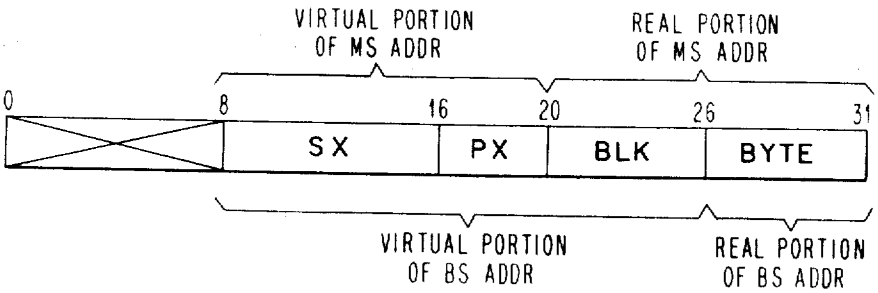
FIG. 1 shows a preferred format of a virtual address.

Since the invention resides primarily in the novel structural combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

VIRTUAL ADDRESS

Referring to FIG. 1, a preferred format for a virtual address is shown. The twenty-four bit virtual address is divided into four fields: a segment field (SX) which occupies bits 8–15; a page field (PX) which occupies bits 16–19; a block field (BLK) which occupies bits 21–25; and a byte field (BYTE) which occupies bits 26–31. With this format, the virtual storage consists of 256 segments, with each segment consisting of up to 16 pages, and each page consisting of up to 4096 bytes which are subdivided into 64 blocks each containing 64 bytes. Those skilled in the art will, of course, recognize that these field definitions are somewhat arbitrary in nature. For example, one could define the virtual address fields so that SX occupied bits 8–11, PX occupied bits 12–20, BLK occupied bits 21–24, and BYTE occupied bits 25–31. With such a format, the virtual storage would consist of 16 segments with each segment consisting of up to 128 pages, and each page consisting of up to 2,048 bytes which are subdivided into 16 blocks each containing 128 bytes. Bits 0–7 are not used in this preferred embodiment, but could optionally be used to extend the virtual address to provide a 32 bit addressing system. Such a system would have over 4 billion bytes of virtual memory. The segment field serves as an index to an entry in the segment table. The segment table entry contains a value which represents the base address of the page table associated with the segment designated by the segment field. The page field serves as an index to an entry in the page table. The page table entry contains a value which represents the actual or real main storage address of the page. The block and byte fields undergo no change during translation to a main storage address, and are concatenated with the translated page address to form the actual or real main storage address. However, to the buffer the block field is also part of the virtual address and requires further translation. The byte field is concatenated with the translated block address to form the real buffer address.

As is shown in FIG. 1: when the address provided by the CPU is regarded as a main storage (MS) address, the segment (SX) and page (PX) fields are the virtual portions of the address while the block (BLK) and byte (BYTE) fields are the real portions of the address; when the address is regarded as a buffer (BS) address, the virtual portion comprises three fields (SX, PX and BLK) while the real portion comprises only the low order BYTE field.

ADDRESS TRANSLATION FOR MAIN STORAGE

Figure 2:
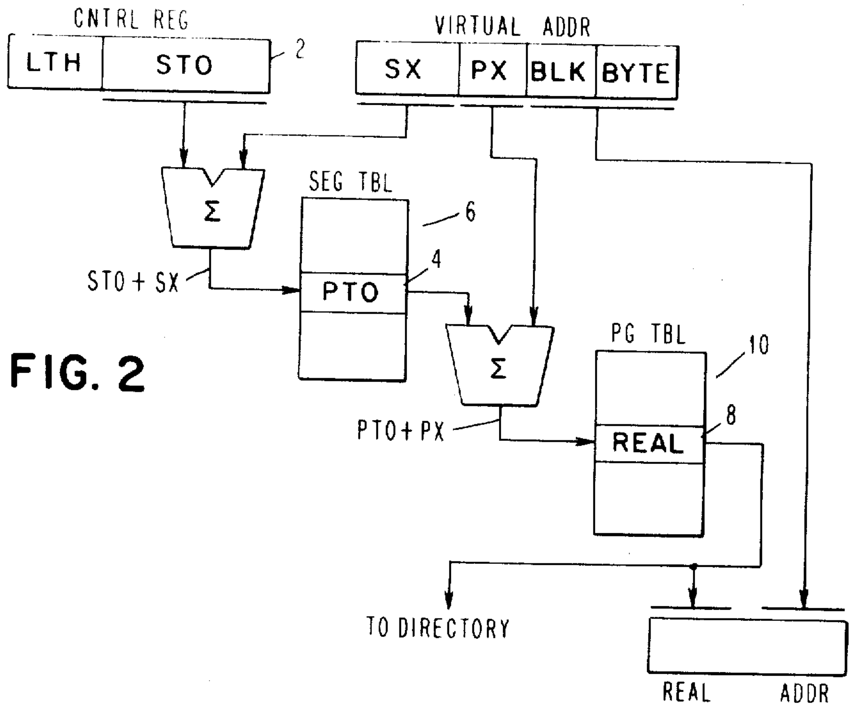
FIG. 2 is a diagrammatic representation of virtual-to-real address translation.

The translation process will be further clarified by reference to FIG. 2. This figure and the following description show details of main storage address translation. The translation process is a two-level table look-up procedure involving segment and page tables from main storage. The segment address portion (SX) of the virtual address is added to a Segment Table Origin (STO) address stored in a control register 2 in order to obtain a segment table entry 4 from the segment table 6. (Control register 2 will also generally contain the length [LTH] of the segment table.) This segment table entry will contain a Page Table Origin (PTO) address which is added to the page address portion (PX) of the virtual address to provide the address of a page table entry 8 within the page table 10. Page table entry 8 will contain a real address which is concatenated with the block and byte portions of the virtual address to form the real address in main storage of a byte of data. To avoid repeating this translation process for every storage reference, a directory is provided for storing the SX and PX portions of the virtual address along with the corresponding real address which was read from the page table. The directory will be continually updated to contain virtual and real page addresses of the most recently referenced pages. Consequently, at the beginning of a translation, the virtual page address under translation will be checked against the directory to see if the real address is already available. If it is, the directory will provide the real page address which will be concatenated with the block and byte portions of the virtual address to form the real main storage address. If the address under translation is not found in the directory, it will undergo translation as described above and will be placed in the directory along with its real address.

Figure 3:
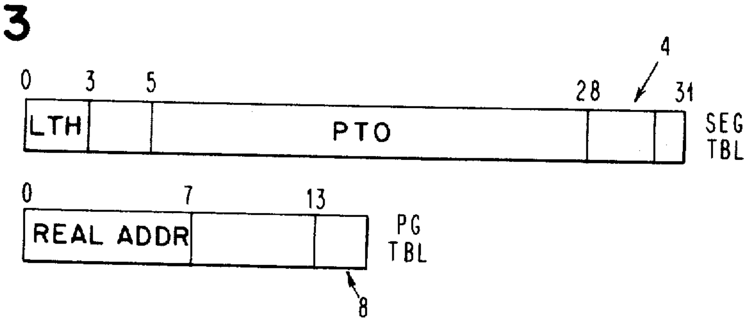
FIG. 3 shows preferred formats for segment table entries and page table entries.

FIG. 3 shows a preferred format for segment table entries 4 and page table entries 8. Foe each virtual address space, there is a segment table, with corresponding page table. The origin and length of the active segment table is contained in the control register (FIG. 2). The segment table entry 4 contains a length (LTH) field in bits 0–3 which designates the length of the page table in increments that are equal to a sixteenth of the maximum size. Bit 31, the I bit, indicates the validity of the information contained in the segment table entry. When the I bit is on, the entry cannot be used to perform translations. The page table entry 8 contains, in bit positions 0–7, the high order eight bits of the real storage address. (The low order real bits of the virtual address are concatenated to the high order bits from the page table to provide the byte displacement within the page.) There is also an I (invalidity) bit associated with each page table entry. When the I bit is on, the entry cannot be used to perform translations.

Translation Process Utilizing the Storage Control and Address Translator (SCAT)

The preceding descriptions have dealt, for the most part, with aspects of virtual memory systems and address translation (often called "relocation") that are already well-known to those skilled in the art. The following descriptions are most directly related to the new and improved method and apparatus for relocation which is provided by the invention claimed hereinafter.

Figure 4:
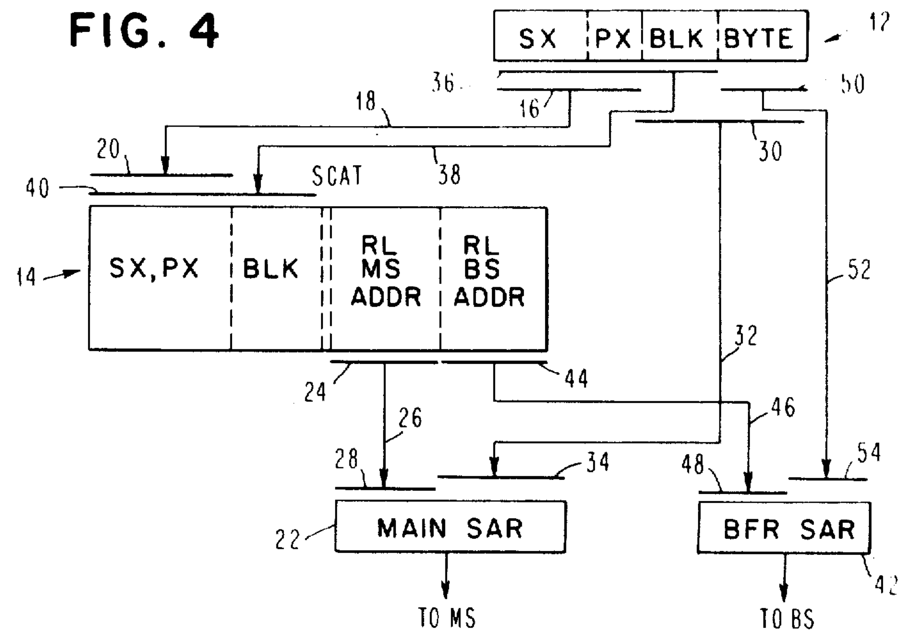
FIG. 4 is a block schematic diagram illustrating elements of a preferred embodiment of this invention.

Various elements of this invention are shown in broad schematic form in FIG. 4. The virtual address contained within a register 12 of the CPU is used to interrogate the Storage Control Address Translator (SCAT) 14. In order to perform the virtual-to-real translation for the main storage address, the segment (SX) and page (PX) portions of the virtual address are transmitted, via gate 16, line 18 and gate 20, to the SCAT to search for an equal compare between these fields and corresponding fields stored in the associative memory of the SCAT. If this interrogation results in one or more equal compares, the high-order portion of the main storage address will be transmitted from the SCAT to the main storage address register 22 via gate 24, line 26 and gate 28. The low-order portion of the real main storage address, comprising the BLK and BYTE fields of the address provided by the CPU is gated from the CPU address register 12 to the main storage address register 22 via gate 30, line 32 and gate 34. In order to obtain the read address of data stored in the buffer, three fields (SX, PX and BLK are gated from the CPU address register 12 via gate 36, line 38 and gate 40 to interrogate the corresponding field in the associative memory of the SCAT. If these fields match the contents of one of the words in the associative memory, the high-order portion of the buffer address is gated to the buffer storage address register 42 from the SCAT via gate 44, line 46 and gate 48. The low-order portion of the buffer storage address is gated from the CPU address register 12 via gate 50, line 52 and gate 54 to the low-order part of buffer storage address register 42.

Those skilled in the art are familiar with the details of various timing and control signals which would be utilized in the system shown in FIG. 4 to furnish appropriate control signals to enable the various gates at the proper times. Various techniques for generating such signals and distributing them through the system are well-known and need not be described herein.

When both of the interrogations described above result in equal comparisons, real addresses for main storage and buffer storage will be supplied to the main storage address register 22 and the buffer storage address register 42, respectively. Then, in the case of a memory read operation, the requested data will be fetched from the buffer and the main storage address contained in address register 22 will generally be ignored. In the cas of a memory write operation, the data may be stored only in the buffer (store-in-buffer system) and the main storage address may be ignored, or the data may be stored into the buffer and into main storage (store-through) in which case both addresses would be utilized by the system. If only the first interrogation described above resulted in an equal compare, this would indicate that the desired data is available in main storage but is not available in the buffer. Main storage would have to be accessed and the data could, if desired, be placed into the buffer. The decision as to whether or not the data should be placed in the buffer would be made in accordance with criteria well-known to those skilled in the art. If the data were to be placed in the buffer, then the SCAT would need to be updated to reflect this change in status of the buffer. Again, the updating would be performed in any one of a number of ways known to those skilled in the art. If neither of the interrogations resulted in an equal compare, this would indicate that the data is not available in the buffer, and is not available in main storage without, at least, translating the virtual address. In this case, the data would have to be brought into main storage (generally, the entire page which contains the data would be brought into main storage) and, if desired, the block containing this data could also be put into the buffer. Any of a number of well-known prior art techniques may be utilized for making the decisions regarding the placement of data and for performing any updating of the SCAT that may be necessary.

Figure 5:
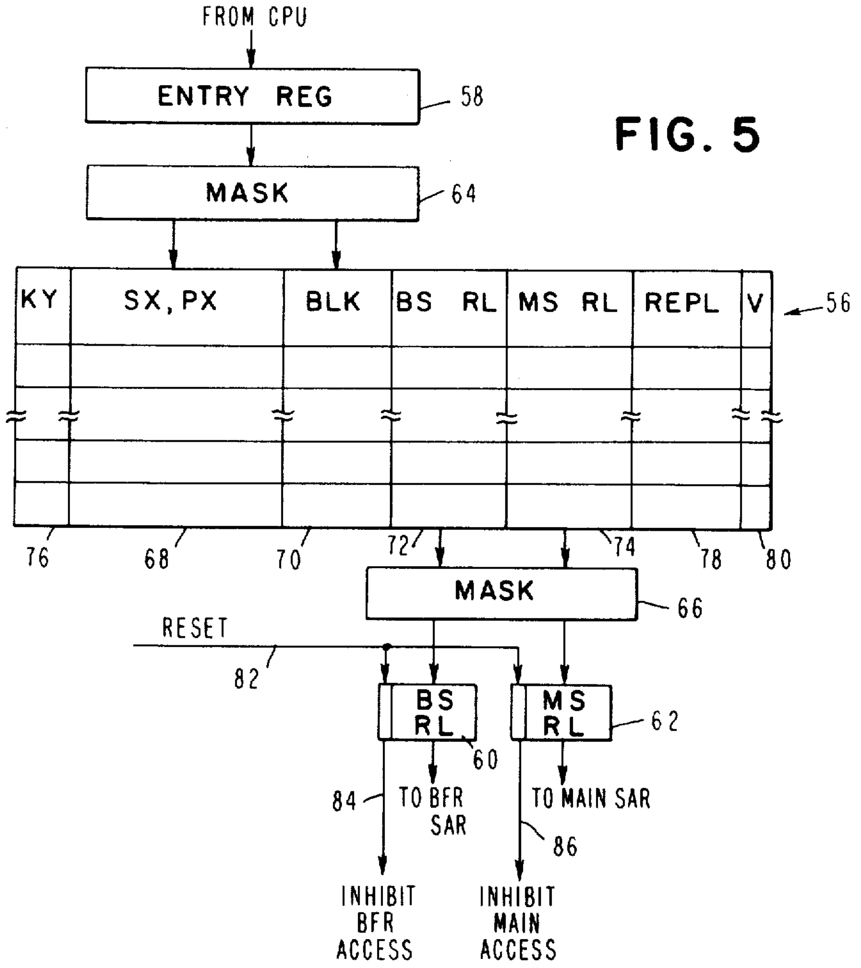
FIG. 5 is a block schematic diagram showing additional details of the Storage Control and Address Translation (SCAT) mechanism.

FIG. 5 shows additional details of one preferred implementation of the Storage Control and Address Translator (SCAT). The SCAT comprises an associative memory 56 along with its entry register 58 and output registers 60, 62. For purposes of field size definition, there are also provided an input mask 64 and an output mask 66. Each word of the associative memory 56 is divided into several fields. So far as this invention is concerned, there are four fields of primary interest: the first field 68 contains the high-order bits of virtual addresses that have been recently translated, generally the segments (SX) and page (PX) bits; the second field 70 contains those bits from recently translated virtual addresses which define a block (BLK) address in the buffer; the third field 72 contains real buffer storage (BS RL) addresses which correspond to the BLK address in the same associative memory word; and the fourth field 74 contains the high-order bits of real main storage (MS RL) addresses corresponding to the SX and PX bits in the same associative memory word. Three additional fields shown for each word in the associative memory 56 are a key (KY) field 76, a replacement (REPL) field 78 and a validity (V) field 80. These fields may be used to: maintain and a check user access keys, control replacement of pages in main storage and/or blocks in buffer storage, and indicate validity of individual words in the associative memory, respectively. Depending upon the requirements of any given specific computer system, these latter three fields may be expanded (or added to) or contracted (or deleted) as desired. Since these fields and their use are well-known to those skilled in the art, and since they are not directly concerned with the present invention, they will not be described herein. This specification also will not describe structural details of the associative memory or exact details of means and methods by which the associative memory may be read (or written into) as these details are also well-known to those skilled in the art and are not necessary for a total understanding of this invention.

The operation of the SCAT shown in FIG. 5 will now be described. The entry register 58 receives the three fields SX, PX and BLK from the CPU. The contents of the entry register 58 are used, under control of the mask register 64, to perform two simultaneous interrogations of the associative memory 56. The bits comprising the SX and PX fields in the entry register are compared against corresponding entries in field 68 of the associative memory. If any equal compares are sensed, there will be a readout of the high-order bits of the corresponding real main storage address from field 74 into output register 62 under control of output mask 66. The other interrogation of the associative memory involves a comparison of the bits in all three fields (SX, PX and BLK) contained in the entry register against fields 68 (SX and PX) and 70 (BLK) of the associative memory words. An equal comparison will result in read out of the high-order bits of a real buffer storage address from field 72 into output register 60 under control of mask 66. If both interrogations result in equal compares, output register 60 will contain the high-order bits of the real address in buffer storage of the desired data and output register 62 will contain the high-order bits of the real address in main storage of the desired data. If only the first-described interrogation resulted in an equal compare, the high-order bits of the real main storage address will be in output register 62 and output register 60 will contain an indication that the desired data is not available from the buffer. If neither interrogation resulted in an equal compare, registers 60 and 62 will contain indications that the desired data is not available in the buffer or in main storage, respectively. These indications of non-availability are preferably set into the output register 60 and 62 prior to interrogation of the associative memory 56 via a reset line 82 which comes from the CPU. This indication could, for example, consist of a "one" bit set into an extra position of each output register. If, after the associative memory interrogation, the output register receives data from one of the associative memory fields 72 or 74, the "one" bit will be inverted to a "zero" bit. Thus, after the interrogation, the presence of a "one" bit in the extra location in either or both of the output registers 60, 62 may be used to generate a buffer access inhibit signal on line 84 or a main storage access inhibit signal on line 86, respectively.

Although the use of mask registers on input and output of associative memories is well-known to those skilled in the art, the manner in which the mask registers 64 and 66 are used to add increased flexibility to this invention is worth some additional discussion. Both of the mask registers 64 and 66 are of a standard nature in the sense that they are preferably coextensive in size with their respective entry register 58 and output registers 60, 62 and that each of the mask registers is loaded in a conventional manner with a predetermined pattern of ones and zeroes. The pattern in entry mask register 64 controls the bit positions of the entry register 58 which are used in the interrogation of associative memory 56. Generally, each position in entry register 58 which corresponds to a position in mask register 64 which contains a "one" bit will enter into the comparison. Thus, the mask register 64 can be used for field definition. For example, in the system described herein, fields 68 and 70 of the associative memory words contain 12 bits and 6 bits respectively. However, if a user of this system wished to re-define his address fields so that SX and PX comprised a 10-bit field and BLK comprised a 5-bit field, he would be able to use this SCAT for his address translation look-ups by merely changing the mask in entry mask register 64 so that two positions in field 68 and one position in field 70 are ignored in the interrogation process. The output mask register 66 may be used in exactly the same manner to define (and change) the portion of the fields 72 and 74 that are read into output registers 60 and 62 respectively. Because entries in the mask registers 64 and 66 will define those portions of the fields 68, 70, 72 and 74 that are actually utilized, the associative memory 56 is preferably implemented in such a manner that each of the fields 68, 70, 72 and 74 is allocated a number of bits equal to the largest number that would ever be contained in that field. If desired, the output mask register 66 can also be used as part of the apparatus of the computer system which indicates whether or not relocation (or address translation) for the main storage is in effect. If an all-zeroes pattern were to be entered into the locations of mask register 66 which control read out into output register 62, the lack of any read out into register 62 would result in a signal on inhibit line 86 which could be used (by means not shown) as a signal for gating addresses from the CPU address register directly to the main storage address register without translation.

Figure 6:
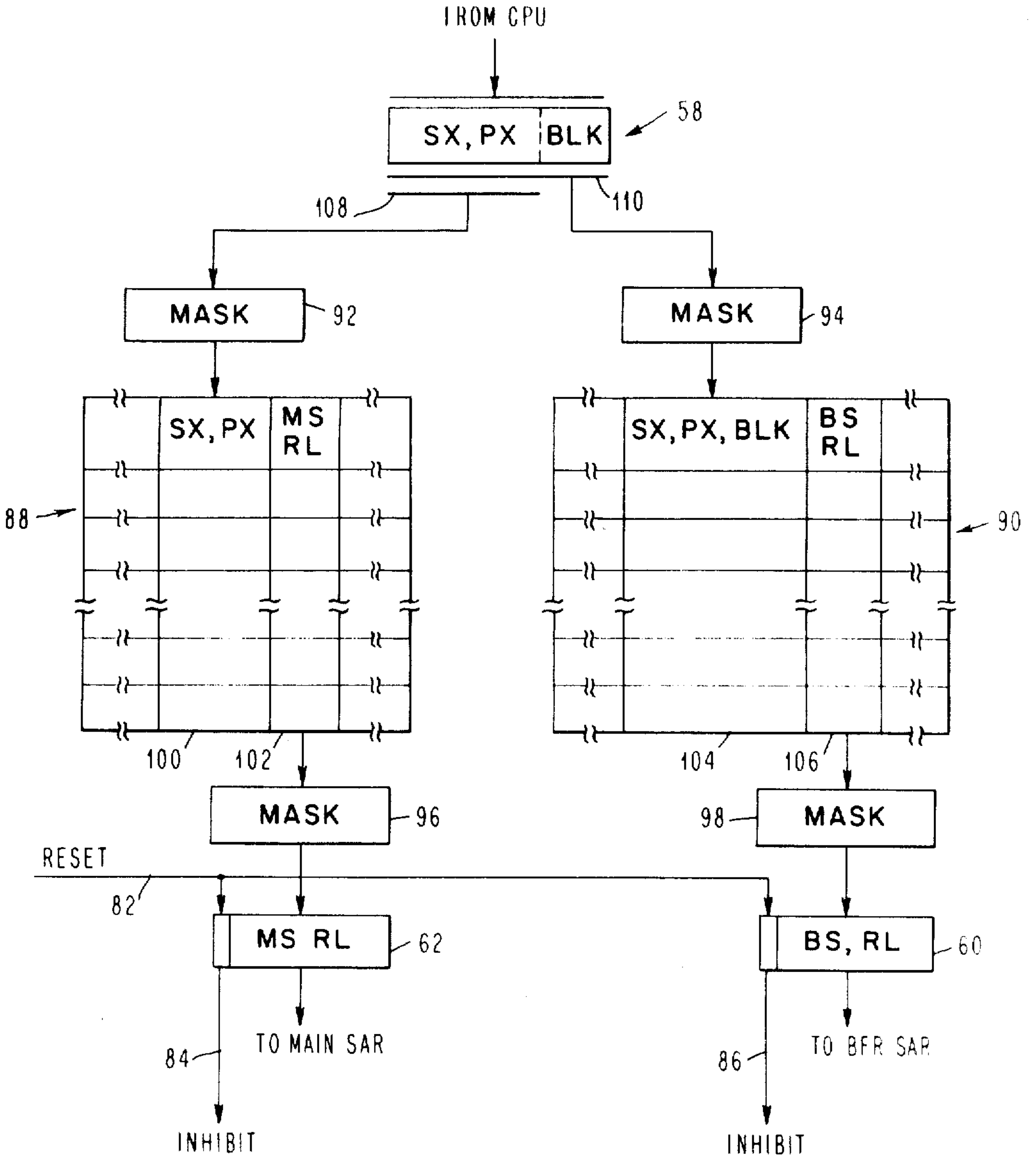
FIG. 6 is a block schematic diagram showing details of an alternative embodiment of the SCAT.

FIG. 6 shows another preferred embodiment of the SCAT which may be less costly to implement than the embodiment shown in FIG. 5. The significant differences between the two embodiments are: the single associative memory 56 of FIG. 5 is replaced in FIG. 6 by two separate associative memories 88, 90; the single input mask register 64 of FIG. 5 is replaced by two input mask registers 92, 94 in FIG. 6; and the single output mask register 66 of FIG. 5 is replaced by two output mask registers 96, 98 in FIG. 6. Associative memory 88 is used for translating the virtual address provided by the CPU into the high-order bits of a real main storage address, and contains (in addition to key, replacement, validity, etc. fields as discussed above) a field 100 which contains virtual segment (SX) and page (PX) designations along with a field 102 which contains corresponding translated high-order real main storage address bits. Associative memory 90 is used for deriving the high-order bits of a real buffer storage address and contains (in addition to other desired fields) a field 104 with the segment (SX), page (PX), and block (BLK) bits from recently translated virtual addresses along with a field 106 which contains the high-order bits of corresponding real buffer storage addresses.

The operation of the system shown in FIG. 6 is substantially identical to that of the system shown in FIG. 5. Entry register 58 receives segment, page and block addresses from the CPU. The segment and page address bits are gated via gate 108 to interrogate associative memory 88 under control of mask 92. Simultaneously, the segment, page and block address bits are gated from entry register 58 via gate 110 to interrogate associative memory 90 under control of mask 94. If an equal comparison is detected in associative memory 88, the high-order bits of a real main storage address will be placed into output register 62 under control of mask 96. If a match is also detected in associative memory 90, the high-order bits of a real buffer storage address will be placed in output register 60 under control of mask 98. With the exception of the fact that the associative memory 56, the entry mask 64 and the output mask 66 of FIG. 5 have been divided into two successive memories 88 and 90, two entry masks 92 and 94 and two output masks 96 and 98, the description of the operation of the system shown in FIG. 5 is directly applicable to the system shown in FIG. 6.

While the invention has been particularly shown and described with reference to preferred embodiments thereof, it will be understood by those skilled in the art that the above and other changes in form and details may be made therein without departing from the spirit and scope of the invention.

What is claimed is:

1. In a data processing system which contains a central processing unit, a main storage having n addressable locations each addressable by a real main storage address, a main storage address register, a buffer storage having fewer than *n* addressable locations each addressable by a real buffer storage address, a buffer storage address register, addressing means providing virtual addresses, and means for translating virtual addresses to real main storage and real buffer storage addresses, wherein each of said virtual addresses comprises a main storage virtual address, a buffer storage virtual address, a main storage real address portion and a buffer storage real address portion; an improved storage control and addressing means comprising:

an associative memory comprising a plurality of words each of which contains a first interrogation field holding a main storage virtual address;

a second interrogation field holding a buffer storage virtual address;

a first result field holding the high-order bits of a main storage real address which corresponds to the main storage virtual address that is in said first interrogation field; and a second result field holding the high-order bits of a buffer storage real address which corresponds to the buffer storage virtual address that is in said second interrogation field;

first means connected between said addressing means and said associative memory for transmitting said main storage virtual address to said associative memory, said main storage virtual address being subjected in said associative memory to a first comparison with the contents of said first interrogation field of said associative memory;

second means connected between said addressing means and said associative memory for transmitting said buffer storage virtual address to said associative memory, said buffer storage virtual address being subjected in said associative memory to a second comparison with the contents of said second interrogation field of said associative memory;

both of said comparisons occurring substantially simultaneously;

said associative memory containing means responsive to an equal compare on said first comparison to cause a first readout of said first result field from a word in the associative memory in which the first interrogation field was equal to said main storage virtual address;

said associative memory containing means responsive to an equal compare on said second comparison to cause a second readout of said second result field from a word in the associative memory in which the second interrogation field was equal to said buffer storage virtual address;

means jointly responsive to the occurrence of both said first and second readouts to indicate that the data referenced by said addressing means is available in said buffer storage; and means jointly responsive to the occurrence of said first readout and the lack of said second readout to indicate that the data referenced by said addressing means is available in said main storage and is not available in said buffer storage.

2. The storage control and addressing means of claim 1 further comprising:

third means connected between said associative memory and said main storage address register to transmit the high-order bits of a main storage real address from said first result field to said main storage address register after said first readout; and fourth means connected between said associative memory and said buffer storage address register to transmit the high-order bits of a buffer storage real address from said second result field to said buffer storage address register after said second readout.

3. The storage control and addressing means of claim 2 wherein:

said associative memory comprises a first associative memory containing said first interrogation field and said first result field, and a second associative memory containing said second interrogation field and said second result field;

said first means is connected between said addressing means and said first associative memory;

said second means is connected between said addressing means and said second associative memory;

said third means is connected between said first associative memory and said main storage address register; and said fourth means is connected between said second associative memory and said buffer storage address register.

4. The storage control and addressing means of claim 3 wherein said associative memory further comprises:

a single entry register for receiving said main storage virtual address and said buffer storage virtual address from said central processing unit;

first gating means connected between said entry register and said first associative memory for transmitting said main storage virtual address to said first associative memory for said first comparison; and second gating means connected between said entry register and said second associative memory for transmitting said buffer storage virtual address to said second associative memory for said second comparison.

5. The storage control and addressing means of claim 1 wherein:

said associative memory comprises a first associative memory containing said first interrogation field and said first result field, and a second associative memory containing said second interrogation field and said second result field;

said first means is connected between said addressing means and said first associative memory; and said second means is connected between said addressing means and said second associative memory.

6. The storage control and addressing means of claim 5 wherein said associative memory further comprises:

a single entry register for receiving said main storage virtual address and said buffer storage virtual address from said central processing unit;

first masking means connected between said entry register and said first associative memory for transmitting said main storage virtual address to said first associative memory for said first comparison; and second masking means connected between said entry register and said second associative memory for transmitting said buffer storage virtual address to said second associative memory for said second comparison.

7. In a virtual storage system in which the virtual storage is divided into a predetermined number of pages with each page consisting of a plurality of blocks of data, a main storage for randomly storing page portions of said virtual storage, a buffer storage for storing block portions of said virtual storage, addressing means providing virtual address signals, with each virtual address having a page portion and a block portion; an improved storage control and addressing means comprising:

an associative storage comprising a plurality of words each of which contains a virtual address part consisting of a page portion and a block portion, and a first associated real page address portion for addressing said main storage and a second associated real block address portion for addressing said buffer storage;

means for simultaneously comparing the page portion of said address signals with corresponding portions of said words in said associative storage and comparing said block portion with corresponding portions of said words in said associative storage to produce a first signal resulting from equality of said first mentioned comparison and a second signal resulting from equality of said second mentioned comparison, said first signal indicating the availability in said main storage of an addressed page portion and said second signal indicating the availability in said buffer storage of an addressed block portion.

8. The storage control and addressing means of claim 7 further including:

means responsive to said second signal for transferring said associated real block address to said buffer storage for subsequent use in addressing said buffer storage.

* * * * *